US009811739B2

(12) United States Patent
Fan Chiang (10) Patent No.: US 9,811,739 B2
(45) Date of Patent: Nov. 7, 2017

(54) SURVEILLANCE SYSTEM AND SURVEILLANCE METHOD

(71) Applicant: VIVOTEK INC., New Taipei (TW)

(72) Inventor: Shih-Wu Fan Chiang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 168 days.

(21) Appl. No.: 14/933,371

(22) Filed: Nov. 5, 2015

(65) Prior Publication Data

US 2016/0125247 A1 May 5, 2016

(30) Foreign Application Priority Data

Nov. 5, 2014 (TW) .............................. 103138436 A (51) Int. Cl.
*G06K 9/00* (2006.01)
*G06F 17/30* (2006.01)
(52) U.S. Cl.
CPC ... *G06K 9/00771* (2013.01); *G06F 17/30256* (2013.01)
(58) Field of Classification Search
CPC ....................... G06K 9/00771; G06F 17/30256
See application file for complete search history.

(56) References Cited

U.S. PATENT DOCUMENTS

| | | | | |
|---|---|---|---|---|
| 4,356,387 A * | 10/1982 | Tsubota | ................... | G07C 9/00 250/221 |
| 4,739,401 A * | 4/1988 | Sacks | ................... | F41G 7/2226 244/3.17 |
| 5,047,962 A * | 9/1991 | Cornish | ................... | G07C 1/00 340/934 |
| 5,583,947 A * | 12/1996 | Florent | ................... | G06T 7/254 348/155 |
| 8,176,527 B1 * | 5/2012 | Njemanze | ............. | G06F 21/554 709/223 |
| 2005/0058321 A1 * | 3/2005 | Buehler | ............. | G06K 9/00771 382/103 |
| 2006/0182357 A1 * | 8/2006 | Liu | ..................... | G06K 9/00771 382/239 |
| 2008/0232688 A1 * | 9/2008 | Senior | ................... | G01S 3/7864 382/181 |
| 2008/0294588 A1 * | 11/2008 | Morris | ............... | G06K 9/00295 706/47 |
| 2010/0061624 A1 * | 3/2010 | Cobb | ................... | G06K 9/6215 382/157 |
| 2012/0109901 A1 * | 5/2012 | Mase | ................ | G06F 17/30265 707/687 |
| 2015/0063628 A1 * | 3/2015 | Bernal | ............... | G06K 9/00771 382/103 |

* cited by examiner

*Primary Examiner* — John Strege
(74) *Attorney, Agent, or Firm* — Maschoff Brennan (57) ABSTRACT

A surveillance system including at least one image capture device and a processor, and a surveillance method are provided. The image capture device is coupled to the processor and captures surveillance images. The processor analyzes the correlation between multiple on site data corresponding to the surveillance images and event information. Each on site data includes time information and detail information. Therefore, the processor determines that the event information is more relevant to the surveillance image corresponding to the detail information having a higher occurrence frequency in the duration of the event information.

12 Claims, 8 Drawing Sheets

SURVEILLANCE SYSTEM AND SURVEILLANCE METHOD

CROSS-REFERENCE TO RELATED APPLICATIONS

This non-provisional application claims priority under 35 U.S.C. §119(a) on Patent Application No(s). 103138436 filed in Taiwan, R.O.C. on Nov. 5, 2014, the entire contents of which are hereby incorporated by reference.

TECHNICAL FIELD

The disclosure relates to a surveillance system and a surveillance method, more particularly to a surveillance system capturing surveillance images by image capturing devices and performing an association analysis to field information about the surveillance images and event information, and a surveillance method thereof.

BACKGROUND

In response to the progressive enhancement of safety awareness, the development of surveillance image surveillance systems progressively tends to be intelligent applications. In addition to the security protection, more applications in multifunctional management are contemplated. Providing various security mechanisms has become a main tendency to develop the modern security surveillance industry.

In fact, digital surveillance nowadays is advantageous for the protection of personal safety, wealth and crime prevention. Content of digital surveillance images can provide some clues to crack a criminal case. Because of the limitation in conventional technology, relevant people need to manually search for associated evidences in thousands of surveillance image files. This is like looking for a needle in a haystack and is inefficient. Also, manual survey causes lower data accuracy. Therefore, it is important for the modern surveillance image surveillance technology to develop an analysis method of surveillance images to quickly and accurately search for one or more point of interest out of thousands of surveillance images.

SUMMARY

Accordingly, the disclosure provides a surveillance system and a surveillance method, in which a computing device is used to automatically analyze correlation between field information about a surveillance image and an event, in order to resolve the weak efficiency and accuracy of manual surveying.

According to one or more embodiments, the surveillance system includes at least one image capturing device and a processor. The image capturing device is electrically connected to the processor and captures surveillance images. The processor analyzes correlation between event information and field information corresponding to each of the surveillance images and comprising time information and detailed information, and according to an occurrence frequency of the detailed information in all the field information in duration of the event information, determines that the surveillance image, which corresponds to the detailed information whose occurrence frequency is higher, is more associative with the event information.

Correspondingly, according to one or more embodiments, the surveillance method includes the following steps. Capture surveillance images and analyze a correlation between event information and field information corresponding to each of the surveillance images. Each field information includes time information and detailed information. Determine that the surveillance image, which corresponds to the detailed information whose occurrence frequency is higher among the plurality of field information in duration of an event of the event information, is more associative with the event information.

In summary, the surveillance system and the surveillance method each employs at least one image capturing device to capture a surveillance image and analyzes the correlation between field information about the surveillance image and certain event information in order to find the surveillance image most associated with the event information.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The disclosure provides an image surveillance apparatus (referred to as surveillance apparatus hereinafter) including at least one image capturing device and a processor. The image capturing device is electrically connected to the processor. The at least one image capturing devices is disposed on at least one position in order to capture surveillance images recording the field information there. In practice, the surveillance images are obtained from one or more image capturing devices in an example. A processing module in the processor analyzes an event information and the field information provided by each of the surveillance images captured by the image capturing device to find out which field information (on site data) is more associated with the event information in order to find out which image capturing device can capture surveillance images more associated with the event information and even find out which surveillance image captured by said image capturing device is more associative with the event information. Each field information includes time information and detailed information. The detailed information herein is information about a certain triggering condition, such as the detection of a certain signal or a certain feature of a certain object. The time information herein is a time point where detailed information appears. In an embodiment, the processor determines an occurrence frequency of the detailed information of the field information in the duration of the event information to search for one or more surveillance images whose occurrence frequencies are relatively high and which may be more associated with the event information.

Figure 1A:
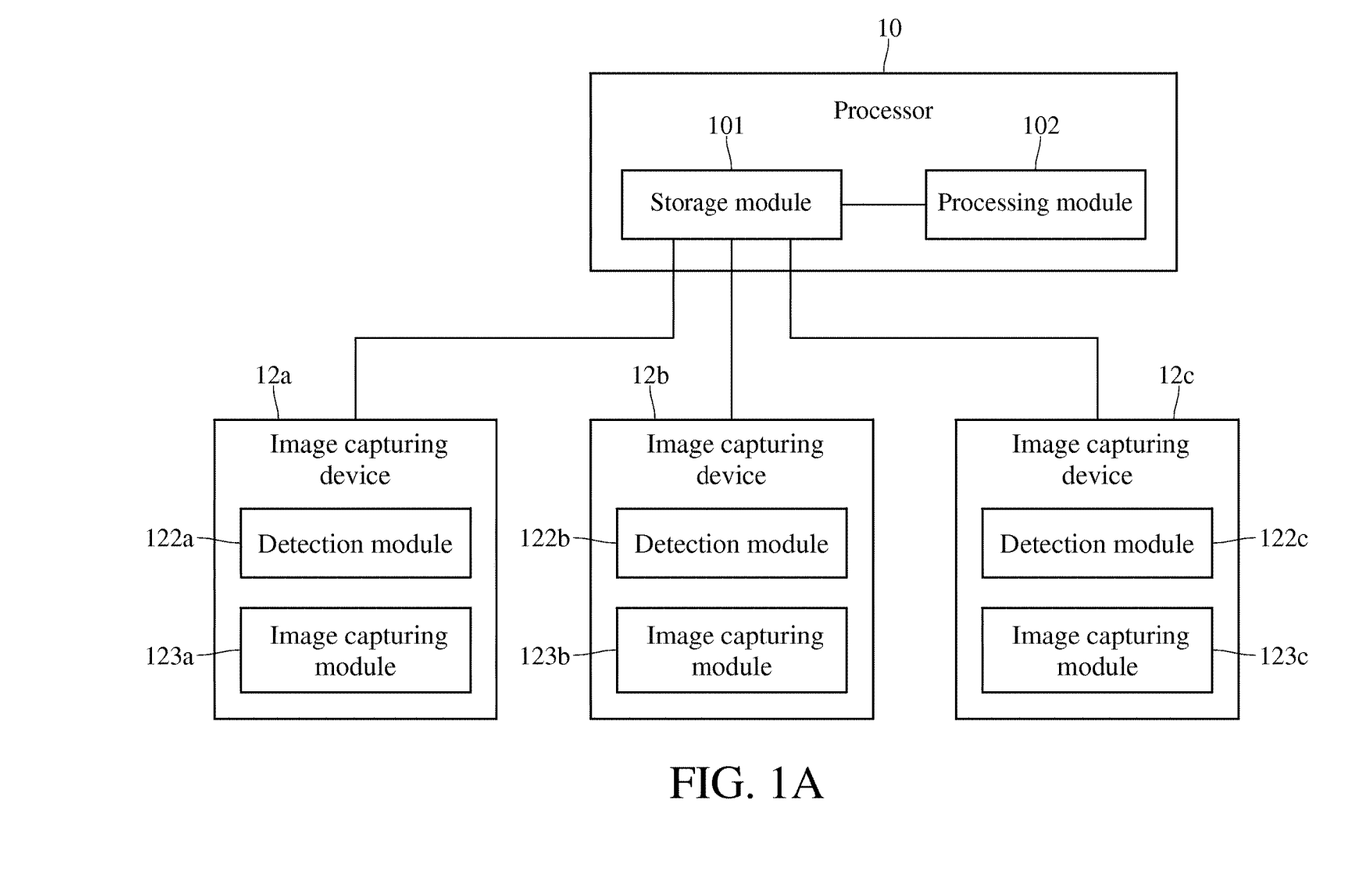
FIG. 1A is a schematic block diagram of a surveillance system capturing surveillance images of field information in an embodiment.

Please refer to FIG. 1A, which is a schematic block diagram of a surveillance system capturing surveillance images of field information in an embodiment. A processor 10 in the drawing includes a storage module 101 and a processing module 102. The image capturing devices 12a, 12b and 12c include the detection modules 122a, 122b and 122c, respectively and image capturing modules 123a, 123b and 123c, respectively. The image capturing devices 12a, 12b and 12c are electrically connected to the storage module 101, and the storage module 101 is electrically connected to the processing module 102. Although the disclosure only employs three image capturing devices (i.e. the image capturing device 12a, 12b and 12c) in this embodiment, other embodiments can also be contemplated in which other numbers of image capturing devices are employed in the surveillance system.

In this embodiment, the image capturing devices 12a, 12b and 12c employ their respective image capturing modules 123a, 123b and 123c to photograph or capture respective surveillance images. When the image capturing modules 123a, 123b and 123c are recording a surveillance image of surveillance images, the detection modules 122a, 122b and 122c will detect whether a preset detection condition is triggered and produce detailed information according to the detection. This detailed information and the time information of its corresponding surveillance image are included into field information. The image capturing devices 12a, 12b and 12c send their respective field information or send their respective field information and the associated surveillance images to the storage module 101 for being stored. The processing module 102 reads one or more field information from the storage module 101 according to the event information inputted, and analyzes the detailed information in the read field information to analyze the occurrence frequency of detailed information in the duration of the event information, so as to determine which surveillance image, whose detailed information has a higher occurrence frequency, is more associated with the event information. In practice, such event information includes at least one time period and position, where a certain event occurred. For example, the event information herein indicates an incident of theft occurring at a first position during a first time period and an incident of theft occurring at a second position during a second time period.

As described in FIG. 1A, in an embodiment, the detection modules 122a, 122b and 122c are, for example, but not limited to, motion detectors whose detection condition is whether there is an object doing at least one specific action. In an embodiment, a motion detector can use an image recognition algorithm to detect whether there is any object doing at least one specific action, such as moving, throwing, running, brandishing a bar in a surveillance image, so as to produce detailed information according to the detection. In practice, the detailed information is, for example, but not limited to, a signal having a high/low or on/off state, or a vector signal having multiple high/low states. Such a high state and a low state indicate whether or not the surveillance image fits in the detection condition, i.e. whether there is an object doing at least one specific action.

In an embodiment, the image capturing devices 12a, 12b and 12c combine such detailed information and the time information of their respective surveillance images into the field information and send the field information to the storage module 101. The time information herein is, for example, but not limited to, a real time point or time period corresponding to the detailed information. The processing module 102 reads one or more field information, which may be associated with the event information, from the storage module 101 according to the event information and performs an association analysis according to the detailed information in the read field information. In this embodiment, the processing module 102 counts how many times the detailed information fits in the detection condition in the duration of the event information, that is, counts how many times an object in the surveillance image corresponding to the detailed information does a specific action in the duration of the event information. The higher number of times of fitting in the detection condition, the more the surveillance image is associated with the event information.

In another embodiment with respect to FIG. 1A, the detection modules 122a, 122b and 122c are infrared ray detectors which can detect whether any object appears in a surveillance image. In this embodiment, the detection condition for the infrared ray detector herein is, for example, but not limited to, whether or not an object appears in a surveillance image. The image capturing devices 12a, 12b and 12c produce respective field information according to whether their surveillance images fit in such a detection condition, and send their respective field information to the storage module 101. The processing module 102 reads from the storage module 101 one or more field information and performs the association analysis on them, which can be referred to the foregoing description and thus, will not be repeated hereinafter.

Figure 1B:
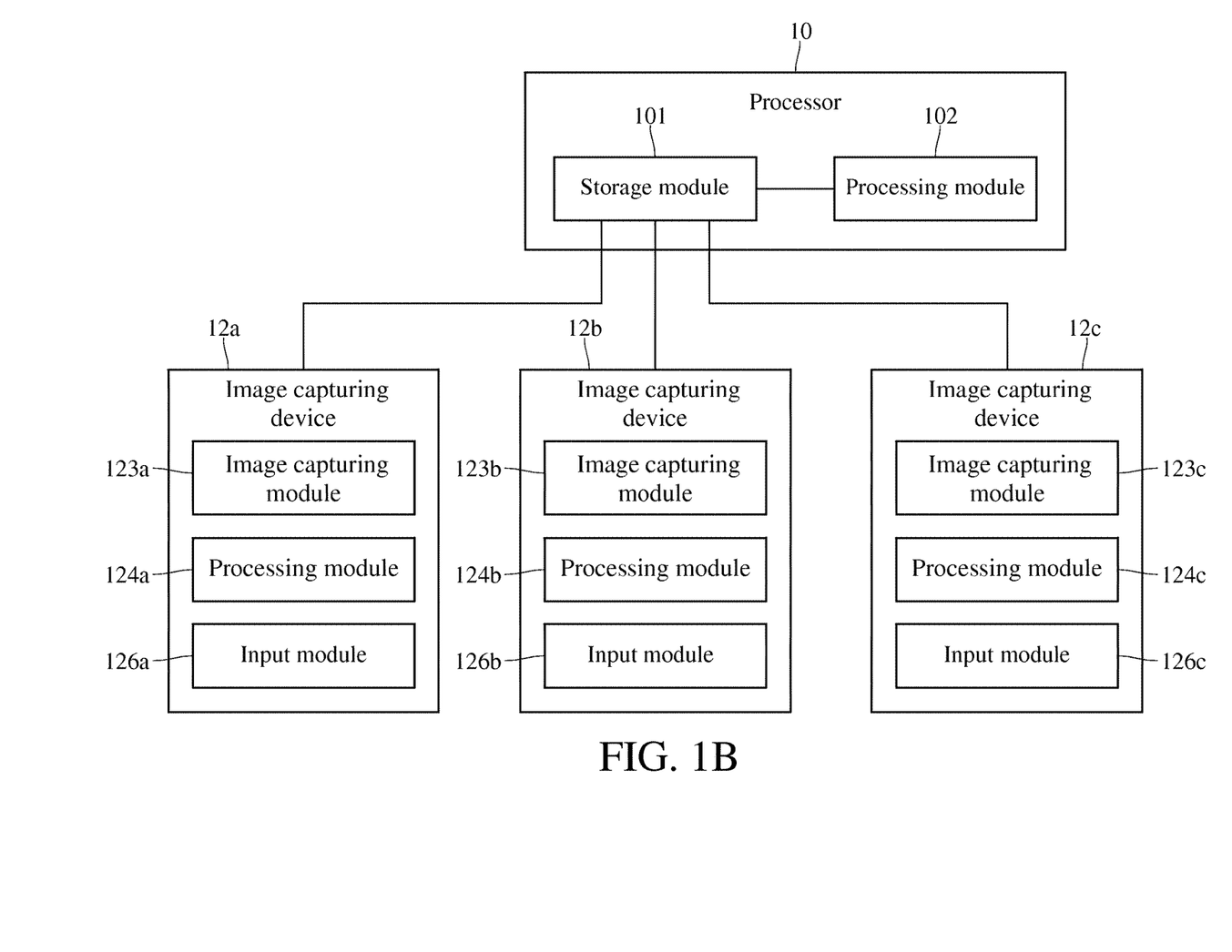
FIG. 1B is a schematic block diagram of a surveillance system capturing surveillance images of field information in another embodiment.

Please refer to FIG. 1B, which is a schematic block diagram of a surveillance system capturing surveillance image images of field information in another embodiment. Different from the embodiment related to FIG. 1A, the image capturing devices 12a, 12b and 12c in FIG. 1B further include processing modules 124a, 124b and 124c and input modules 126a, 126b and 126c. The input modules 126a, 126b and 126c allow users to input some on-site information at scenes where the image capturing devices 12a, 12b and 12c are located, such as temperatures, sounds, and sensed light, so as to produce corresponding detailed information. Then, as described as above, this detailed information and the associated time information are combined into field information to which the processor 10 will perform the relative process and analysis later, which can be referred to in the aforementioned relative description and thus, will not be repeated hereinafter.

In an embodiment with respect to FIG. 1B, the input modules 126a, 126b and 126c are, for example, but not limited to, microphones used to collect on-site sounds at locales where the image capturing devices 12a, 12b and 12c are located. The processing modules 124a, 124b and 124c herein are, for example, analog to digital converters (AD converter) and assemblies of relative signal process circuits and are used to covert the sounds collected by the microphones into digital signals for the later process analysis. In this embodiment, a detection condition for the processing modules 124a, 124b and 124c is, for example, but not limited to, whether the decibels of the collected sounds exceeds a preset threshold or whether the frequency spectrum of the collected sounds falls in a specific frequency band having a characteristic value. When the collected sound fits in such a detection condition, an associated one of the processing modules 124a, 124b and 124c generates corresponding respective detailed information and such detailed information is, for example, a signal having the high/low or on/off state, as described as above. Then, the associated one of the image capturing devices 12a, 12b and 12c combines the detailed information and the associated time information into the field information and sends the field information to the storage module 101, whereby the processing module 102 can perform association analysis to one or more field information stored in the storage module 10 later.

Figure 1C:
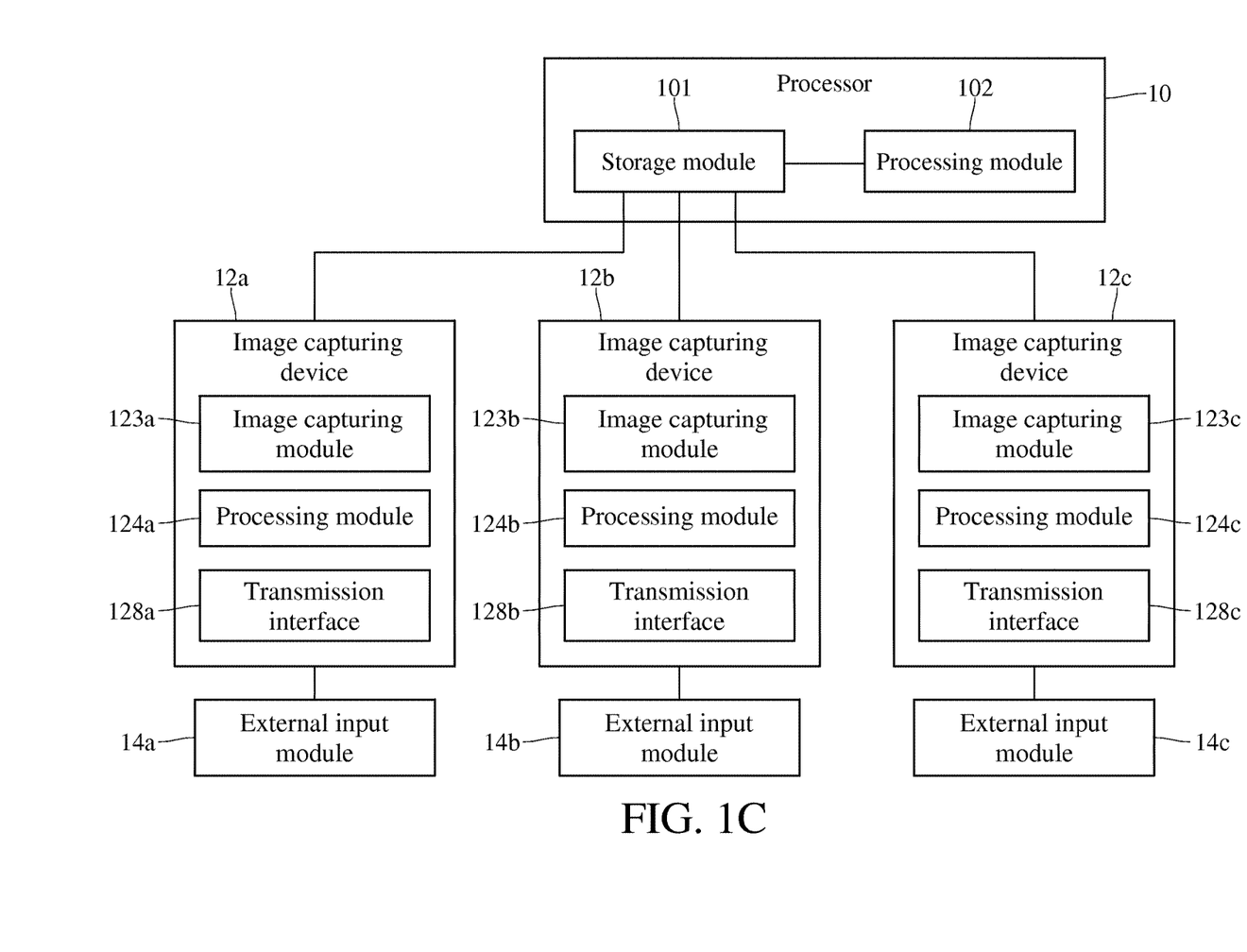
FIG. 1C is a schematic block diagram of a surveillance system capturing surveillance images of field information in yet another embodiment.

Please refer to FIG. 1C, which is a schematic block diagram of a surveillance system capturing surveillance image images of field information in yet another embodiment. In addition to the image capturing modules 123a, 123b and 123c and the processing modules 124a, 124b and 124c as described as above, the image capturing devices 12a, 12b and 12c further include transmission interfaces 128a, 128b and 128c, respectively. Moreover, the surveillance system further includes external input devices 14a, 14b and 14c. The external input devices 14a, 14b and 14c are electrically connected to the transmission interfaces 128a, 128b and 128c in the image capturing devices 12a, 12b and 12c, respectively. In practice, the transmission interfaces 128a, 128b and 128c are, for example, but not limited to, digital input (DI) ports of the image capturing devices 12a, 12b and 12c or universal serial buses (USBs), respectively.

Different from the embodiment in FIG. 1B, the image capturing devices 12a, 12b and 12c in FIG. 1C are pluggable to be coupled to the external input devices 14a, 14b and 14c through the transmission interfaces 128a, 128b and 128c, respectively. The external input devices 14a, 14b and 14c are, for example, external image sensors, external infrared ray detectors or external microphones. The pair comprising the external input device 14a and the transmission interface 128a, the pair comprising the external input device 14b and the transmission interface 128b, and the pair comprising the external input device 14c and the transmission interface 128c are equivalent to the input modules 126a, 126b and 126c in FIG. 1B in function, respectively. The surveillance system in FIG. 1C can be pluggable to be coupled to the external input devices 14a, 14b and 14c through the transmission interfaces 128a, 128b and 128c and allows the replacements for the external input devices 14a, 14b and 14c which conform to the standards of the transmission interfaces 128a, 128b and 128c, so as to enhance the expandability of hardware and the flexibility of the surveillance scheme for the surveillance system in the disclosure. Accordingly, the processing modules 124a, 124b and 124c produce respective detailed information in response and perform relative association analysis at the next stage, which can be referred to in the aforementioned description and thus, will not be repeated hereinafter.

Another embodiment of the surveillance system can be contemplated in which the metadata of surveillance images is used as field information, and the detailed information in the field information includes information about at least one object appearing in the surveillance images and information about at least one feature of the object. The processor can search for an object more associated with the event information in the plurality of metadata according to the occurrence frequency of the object having a specific feature in the plurality of metadata in the duration of the event information.

Figure 2:
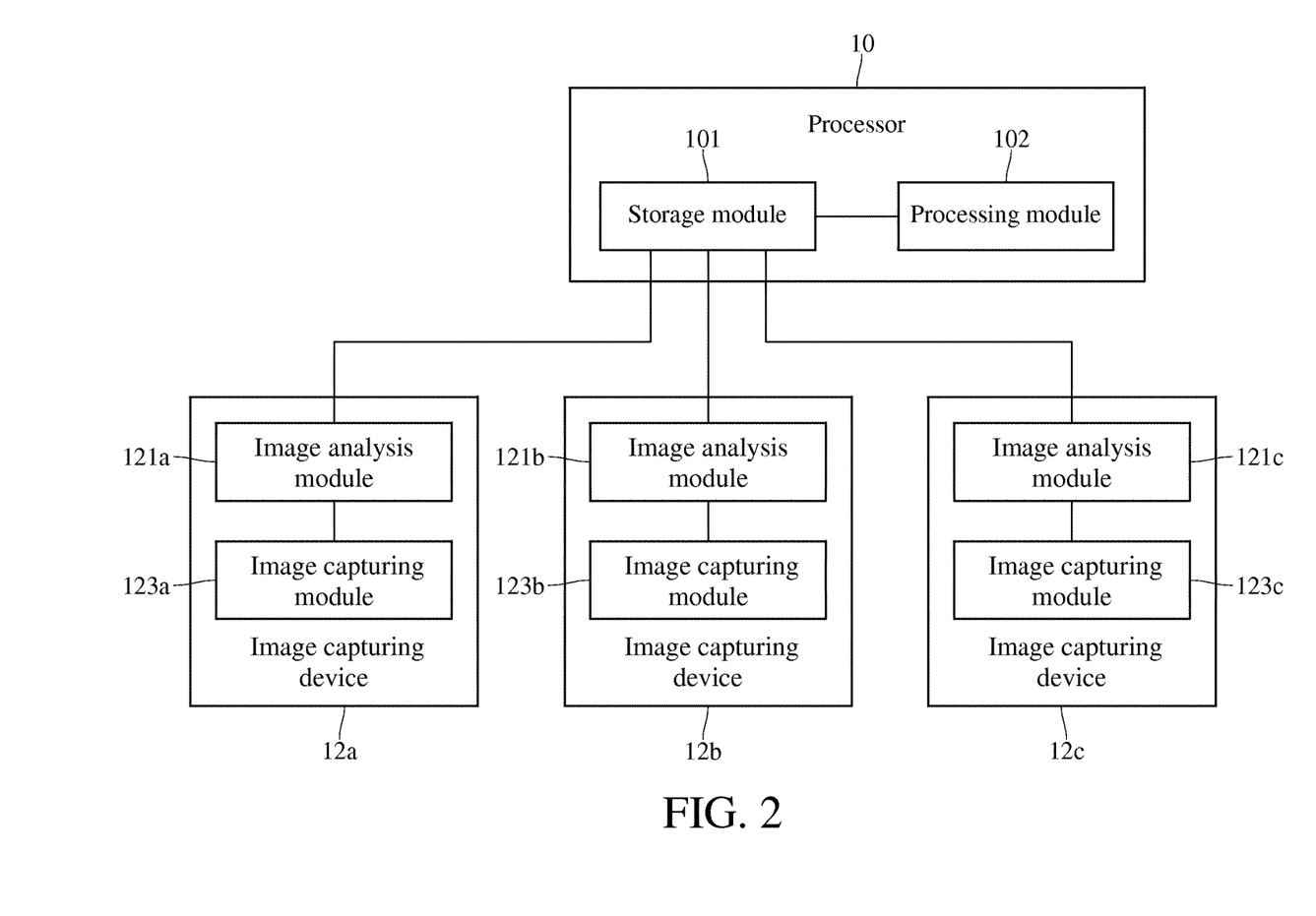
FIG. 2 is a schematic block diagram of the surveillance system when analyzing the metadata via a front-end device in an embodiment.

Please refer to FIG. 2, which is a schematic block diagram of the surveillance system when analyzing the metadata via a front-end device in an embodiment. The surveillance system herein includes the processor 10 and the image capturing devices 12a, 12b and 12c. The processor 10 includes the storage module 101 and the processing module 102, the image capturing devices 12a, 12b and 12c include image analysis modules 121a, 121b and 121c and the image capturing modules 123a, 123b and 123c. The storage module 101 is electrically connected to the processing module 102 and the image analysis modules 121a, 121b and 121c, and the image analysis modules 121a, 121b and 121c are electrically connected to the image capturing modules 123a, 123b and 123c, respectively. As descried above, the image capturing devices 12a, 12b and 12c in this embodiment are exemplary rather than being used to limit the scope the disclosure so that the amount of image capturing devices in the surveillance system can be designed.

In this embodiment, the image capturing devices 12a, 12b and 12c employ the image capturing modules 123a, 123b and 123c to capture multiple surveillance images. The image capturing modules 123a, 123b and 123c are, for example, surveillance image cameras each including a charge coupled device (CCD) or a complementary metal oxide semiconductor (CMOS) sensing element. These surveillance images are, for example, images of scenes indicating respective positions or images of scenes indicating different angles at the same position. For example, these surveillance images are, but not limited to, images captured at multiple intersections or at respective entrances and/or exits of a building or are images of an open space captured at different angles.

Then, the image capturing modules 123a, 123b and 123c send their surveillance images to the image analysis modules 121a, 121b and 121c, respectively and the image analysis modules 121a, 121b and 121c analyze these surveillance images to obtain the metadata of each of the surveillance images. Each of the image analysis modules 121a, 121b and 121c analyzes the type of one or more objects in the surveillance images and one or more features of the object type. In practice, each of the image analysis modules 121a, 121b and 121c can use, e.g. one or more algorithms related to the image recognition to analyze each of the surveillance images to obtain metadata. Each metadata corresponds to each of the surveillance images captured by one of the image capturing devices 12a, 12b and 12c, and includes time information and detailed information. The time information in metadata is, for example, a time point at which the surveillance image is captured, or a time period covering such a time point. The detailed information in metadata corresponds to, for example, the analysis result of one of the corresponding image analysis modules 121a, 121b and 121c.

Also, the metadata of a respective surveillance image is stored in the storage module 101 in order to establish a comparison database for the association analysis executed by the processing module 102 according to event information. The processing module 102 uses an association rule to read each metadata from the storage module 101 according to the event information and analyze the associability of each metadata and the event information. Specifically, the association rule herein is to analyze an occurrence frequency of at least one object having at least one feature in the metadata of the surveillance images in the duration of the event information in order to search for the object more associative with the event information. In practice, the object is, for example, but not limited to, a human or car in a surveillance image, and a feature of a object is, for example, but not limited to, the age, gender or appearance of a human or the model, color, appearance or registration number of a vehicle. The so-called association rule is, for example, but not limited to, calculating a correlation coefficient of each object in the database and searching for a target object, whose correlation coefficient is higher than a preset threshold, through the assistance of a tree search algorithm according to a preset storage data format. It should be understand that the aforementioned association rule is exemplary but will not limit the disclosure, and thus, other embodiments of the association rule may be contemplated.

In an embodiment, the processing module 102 further calculates a correlation coefficient for each object having at least one feature, and this calculation of the correlation coefficient is performed by gathering statistics on or performing the probability analysis to the number of times of an object having at least one feature in the duration of the event information. Then, the processing module 102 selects one or more objects having at least one feature and having a correlation coefficient higher than the preset threshold. When there is only one object having at least one feature during the selection, this object is the most associated with the event information. When there are multiple objects having at least one feature during the selection, the processing module 102 then establishes a correlation list recording these objects arranged according to the magnitudes of their correlation coefficients. In an embodiment, the surveillance system further includes one more input module that is electrically connected to the processing module 102 in the processor 10 and allows users to input event information. For example, the input module is a keyboard, mouse, microphone or touch panel.

In a real life example, the processing module 102 may analyze the relationships between multiple metadata and a theft of drain cover. Assume this theft occurred at a certain position at three time points. Then, the processing module 102 reads from the storage module 101 the metadata produced during these three time periods and analyzes the read metadata. The three time periods cover the three time points which this incident occurred at. For example, if one of the three time points is 22:01:00, then a corresponding time period covering this time point is 22:00:00~22:02:00.

For this incident of theft, the processing module 102 analyzes the metadata of each of the surveillance images captured during these time periods to obtain an occurrence frequency of each car having a respective color, model and vehicle registration number or an occurrence frequency of each person having a respective gender and age. For example, the processing module 102 performs a preliminary analysis to the metadata, thereby determining that a red truck, a 20-ish year old man and a woman having long hair wearing a white long skirt appear in the locale during the three time periods. Then, the processing module 102 calculates the number of times each of these people and the truck are recorded in the metadata, then sets these numbers of times as respective correlation coefficients, and compares these correlation coefficients with a preset threshold in order to determine a person or car whose correlation coefficient is higher than the preset threshold. In an example, if this truck appears 3 times, this man appears twice and this woman appears once, then their correlation coefficients are 3, 2 and 1, respectively. Herein, if the preset threshold is 3, then this truck is considered an object that is most associated with this theft; if the preset threshold is 2, then both this truck and this man are considered objects having a higher correlation with the theft as compared to this woman. Accordingly, the processing module 102 establishes a correlation list recording this truck and this man, and this truck has a higher priority than this man in the list.

In an embodiment, the processing module 102 further calculates a confidence index according to the correlation coefficient and other conditions. For example, a confidence index is a ratio of a correlation coefficient and a threshold. In an embodiment with respect to the above theft, if the preset threshold is 2, the confidence indexes for the above three objects are 1.5, 1 and 0.5, respectively. In an embodiment, the processing module 102 further considers whether a respective feature of each object, the position of the source of the associated surveillance image and/or the capturing time of the associated surveillance image fits in the event information, and uses such information to calculate a correlation coefficient of a respective object at more aspects in order to obtain a confidence index indicating the correlation between a respective object and the event information. The described calculation of confidence indexes is exemplary and will not limit the disclosure, and other embodiments of the calculation of confidence indexes are also contemplated.

Basically, the surveillance system in the disclosure includes at least one image capturing module. The number of image capturing modules merely affects the variety of space-time when the processing module 102 is performing the association analysis, rather than the association rule that the processing module 102 follows. In other words, even if there is only one image capturing module in the surveillance system, the processing module 102 can still use the same association rule to perform the association analysis to the event information and the metadata. Alternatively, the association rule is designed according to the number of image capturing devices so as to achieve the more efficient association analysis.

In an embodiment, the surveillance system includes a single image capturing module 12a, and the storage module 101 stores multiple metadata corresponding to different time points of one surveillance image captured by the single image capturing module 12a at the same position. The processing module 102 uses the association rule to analyze the correlation between the event information and the metadata corresponding to the surveillance images captured during multiple time periods. The metadata in this embodiment depends on one single surveillance image while the metadata in the previous embodiment depends on more than one surveillance image. On the other hand, the higher the number of metadata there is, the more it avoids the neglect of one or more objects appearing in a certain incident. This may cause the result of the association analysis to become more reliable. Once the source of surveillance images is surely from a crucial position, one or more objects having high correlation with the event information can still be found.

In an example with respect to the one single image capturing module, an image capturing device is installed at the entrance of a street in order to capture a surveillance image and store multiple metadata, which correspond to respective time points of the surveillance image, to the storage module 101 in the processor 10. When a series of theft occurs at different time points near this entrance, the processing module 102, as described above, determines whether any object having at least one feature frequently appears in these metadata during multiple time periods, and each of the time periods covers the duration of one of the respective thefts. Herein, a time period and a time point covered by the time period can be referred to in the embodiment with respect to the incident the theft of the drain cover as described above. For example, if a time point is 22:01:00, then a time period covering the time point is 22:00:00~22:02:00. In addition, the processing module 102 further compares an occurrence frequency of each object with a preset threshold in order to determine which object is more associated with the series of thefts occurring at different time points.

Figure 3A:
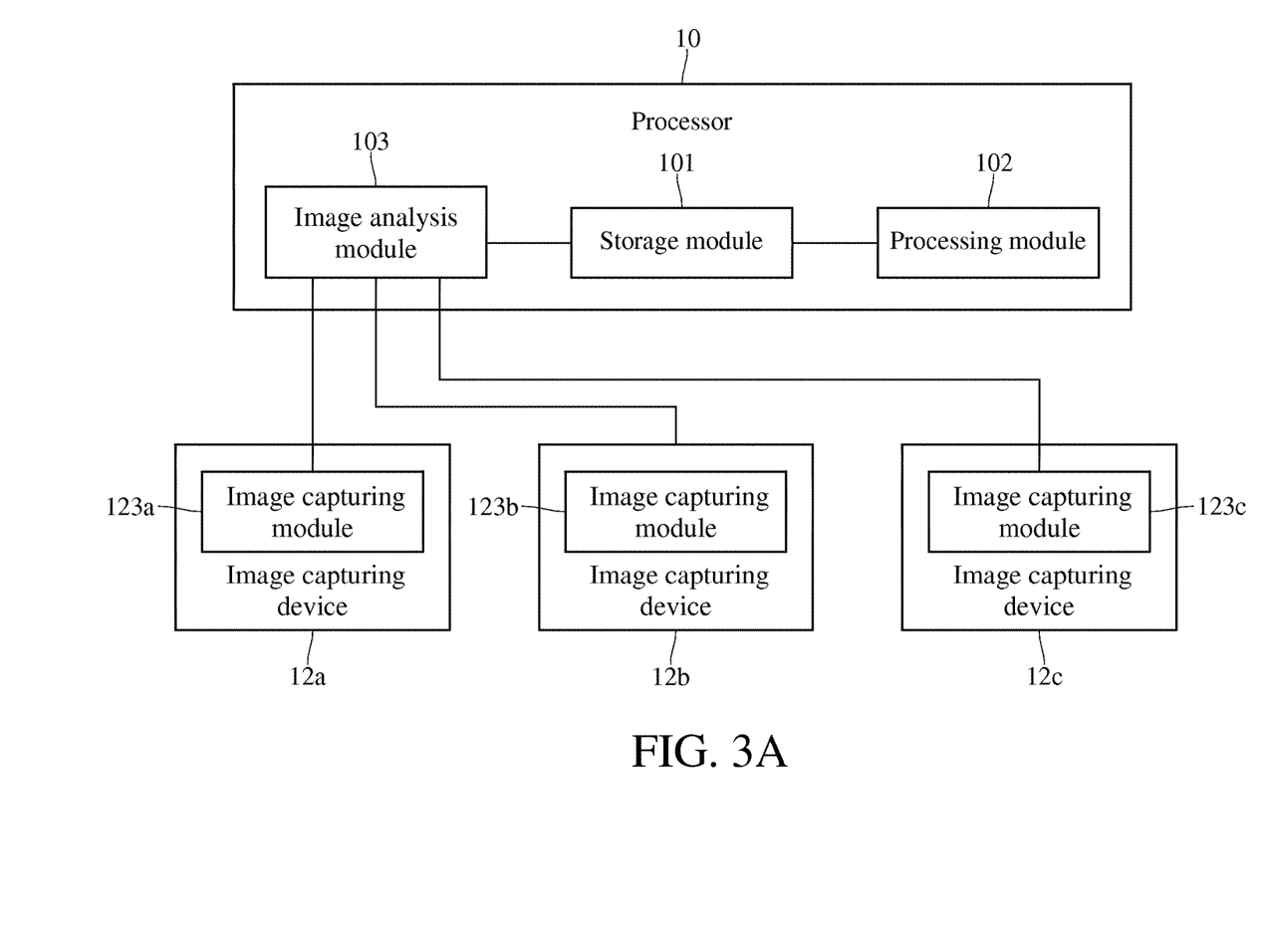
FIG. 3A is a schematic block diagram of the surveillance system when analyzing the metadata via a back-end device in an embodiment.

Please refer to FIG. 3A, which is a schematic block diagram of the surveillance system when analyzing the metadata via a back-end device in an embodiment. Different from the embodiment with respect to FIG. 2, the processor 10 in FIG. 3A includes the image analysis module 103 electrically connected to the image capturing modules 123a, 123b and 123c, and the storage module 101 in FIG. 3A is electrically connected to the processing module 102 and the image analysis module 103. In this embodiment, the metadata corresponding to the one single surveillance image is produced by the image analysis module 103 in the processor 10 which is considered a back-end device. After the image capturing devices 12a, 12b and 12c capture surveillance images, the image capturing devices 12a, 12b and 12c send the image analysis module 103 their respective surveillance images in streaming mediums. The image analysis module 103 analyzes the received surveillance images to obtain respective associated metadata and stores the respective associated metadata in the storage module 101 for the processing module 102 to perform the above association analysis, which will not be repeated hereinafter.

In an embodiment with respect to FIG. 3A, the storage module 101 can also store the above surveillance images. After the image analysis module 103 analyzes the above surveillance images to produce such respective metadata, the image analysis module 103 will send only the metadata to the storage module 101 in an example or will send each of the surveillance images and the metadata corresponding to the surveillance image to the storage module 101. In another embodiment, the image capturing modules 123a, 123b and 123c are electrically connected to the storage module 101 and the image analysis module 103 so that the surveillance images can simultaneously be sent to the image analysis module 103 and the storage module 101. The storage module 101 stores the surveillance images sent by the image capturing modules 123a, 123b and 123c and the associated metadata sent by the image analysis module 103, and the image analysis module 103 will not send the received surveillance images to the storage module 101.

Figure 3B:
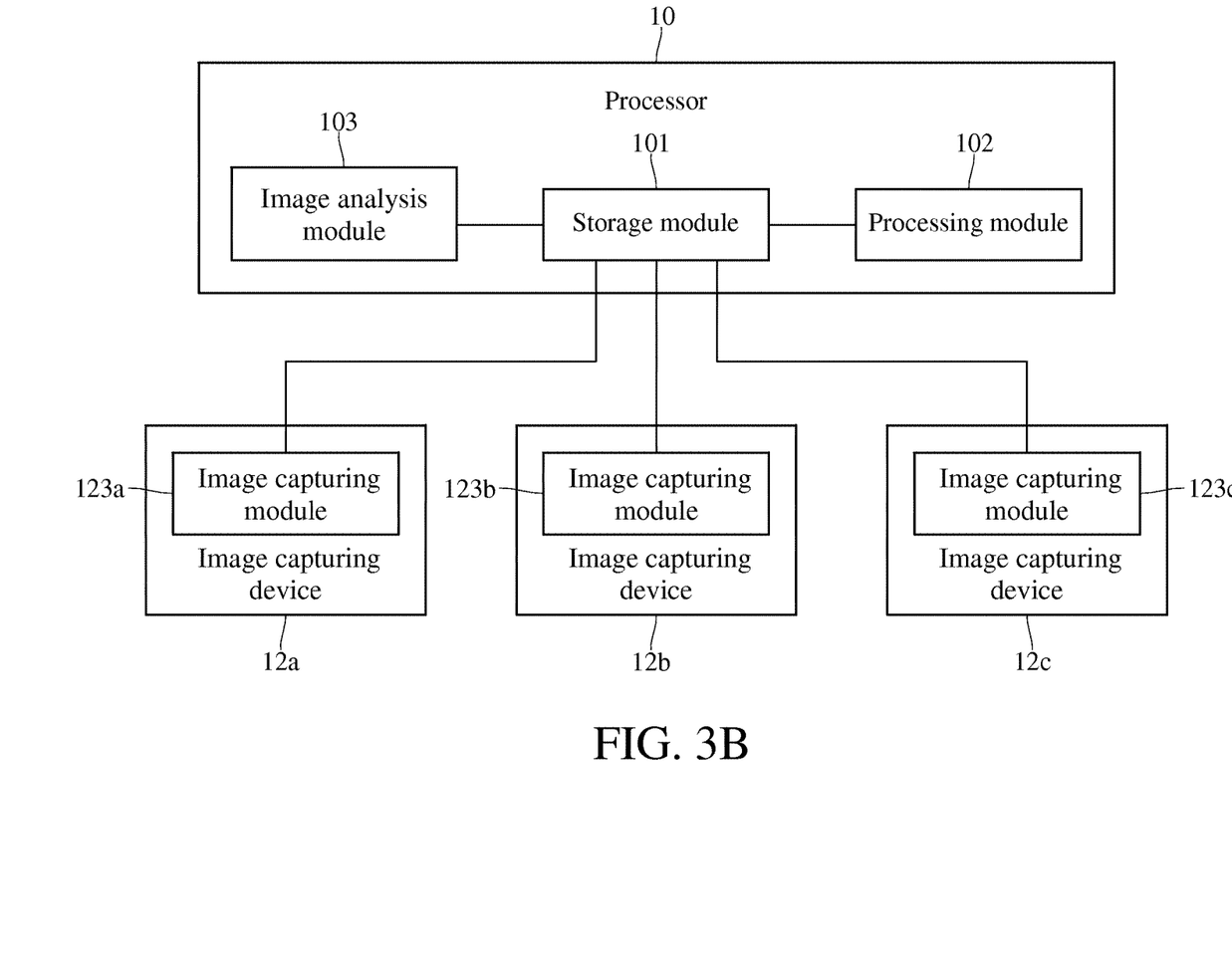
FIG. 3B is a schematic block diagram of the surveillance system when analyzing the metadata via a back-end device in another embodiment.

Please refer to FIG. 3B, which is a schematic block diagram of the surveillance system when analyzing the metadata via a back-end device in another embodiment. Different from the embodiment with respect to FIG. 3A, as described in FIG. 3B, the image capturing modules 123a, 123b and 123c are electrically connected to the storage module 101, the storage module 101 is electrically connected to the image analysis module 103 and the processing module 102. The image capturing modules 123a, 123b and 123c send surveillance images to the storage module 101. The image analysis module 103 reads these surveillance images from the storage module 101 and analyzes them to produce respective metadata, and then the respective metadata is stored in the storage module 101. The processing module 102 reads the respective metadata from the storage module 101 in order to perform the above association analysis to the above event information and the respective metadata.

In another embodiment with respect to FIG. 3B, the image analysis module 103 is further electrically connected to the processing module 102. The processing module 102 commands the image analysis module 103 to selectively read one or more surveillance images from the storage module 101 according to the event information in order to analyze the metadata of the read surveillance image, and stores the metadata in the storage module 101. The processing module 102 then selectively reads one or more required metadata from the storage module 101 according to the event information in order to perform the association analysis to the event information and the read metadata. For example, in an embodiment, if the event information is related to a first position, the processing module 102 commands the image analysis module 103 to analyze one or more surveillance images collected from a region that is 500 meters in circumference around the first position. The processing module 102 analyzes the one or more surveillance images collected in this region to obtain respective metadata, and then performs the above association analysis to the respective metadata. Though limiting the positions of sources of surveillance images, the disclosure may avoid the analysis of unnecessary metadata and the unnecessary association analysis in order to enhance the analysis speed and reduce the system workload.

As described in the embodiments with respect to FIG. 3A and FIG. 3B, the storage module 101 stores surveillance images in addition to the metadata corresponding to the respective surveillance images. When a more ideal analysis method of metadata is promoted for the above one or more embodiments, the image analysis module 103 may be replaced by another image analysis module or carried out by another way in order to produce new respective metadata corresponding to each of the surveillance images by a different way. This new respective metadata may replace old respective associated metadata, or both the new respective metadata and the old respective associated metadata are used to perform a cross comparison analysis. In this way, the disclosure may achieve a better flexibility in the design of the surveillance system. Moreover, the system in FIG. 3A and 3B is disposed with at least one image capturing device, and an optimal association rule for the embodiments in FIG. 3A and 3B can be designed according to the amount of image capturing devices, as described in FIG. 2.

The above one or more embodiments with respect to FIG. 2 illustrate that the image capturing devices 12a, 12b and 12c use their image analysis modules 121a, 121b and 121c to analyze respective surveillance images to obtain respective metadata. As compared to the one or more embodiments with respect to FIG. 2, the above one or more embodiments with respect to FIG. 3A and FIG. 3B illustrate that the processor 10 employs the image analysis module 103 to analyze surveillance images to produce metadata corresponding to each of the surveillance images. The image capturing devices 12a, 12b and 12c in the front end and the processor 10 in the back end all have an ability of image analysis. In an embodiment, each of the image capturing devices 12a, 12b and 12c includes a first image analysis module (not shown), and the processor 10 includes a second image analysis module (not shown). Each of the first image analysis modules is electrically connected to associated one of the image capturing modules 123a, 123b and 123c in the image capturing devices 12a, 12b and 12c, and all the first image analysis modules are electrically connected to the second image analysis module in the processor 10. The storage module 101 is electrically connected to the second image analysis module and the processing module 102.

In this embodiment, the image capturing modules 123a, 123b and 123c send their surveillance images to the first image analysis modules, respectively. Each of the first image analysis modules completes the analysis of one surveillance image in part to obtain partial metadata and sends the surveillance image and the partial metadata to the second image analysis module in the processor 10. Then, the second image analysis module completes the remaining analysis of the surveillance image to obtain the entire metadata of the surveillance image and sends the metadata to the storage module 101. Alternately, the first image analysis module merely carries out the initial analysis of the surveillance image to obtain initial metadata, and the second image analysis module completes the detailed analysis of the surveillance image according to the initial analysis of the first image analysis module to obtain the entire metadata of the surveillance image. The surveillance images herein can be stored in the storage module 10 or not, as described above. In this embodiment, the processor 10 participates in the analysis of a respective surveillance image to complete the metadata in the back end so that the image capturing devices 12a, 12b and 12c in the front end may be simplified in their hardware designs and send respective surveillance images and the partial or initial metadata associated with each of the surveillance images to the processor 10 more immediately, and then, the processor 10 may perform the above association analysis more immediately.

In an embodiment, such a partial or initial analysis is performed to all features of a different object or to a different feature of a different object. For example, in an embodiment, the first image analysis modules in the image capturing devices 12a, 12b and 12c mainly partake in the analysis of humans in the surveillance images, and the second image analysis module in the processor 10 mainly partakes in the analysis of vehicles in the surveillance images. In another embodiment, the first image analysis modules in the image capturing devices 12a, 12b and 12c mainly partake in the analysis of human faces in the surveillance images and provide the second image analysis module in the processor 10 with the analysis results and the information about one or more positions where one or more human faces exist in the surveillance images, and the second image analysis module then analyzes one or more features of a respective face in the surveillance image (e.g. the recognition of the five sense organs on a respective face or the like) according to the analysis result of the first image analysis module and the information about the position where a respective human face is located. Such a division of work may enhance the entire processing speed.

Figure 4:
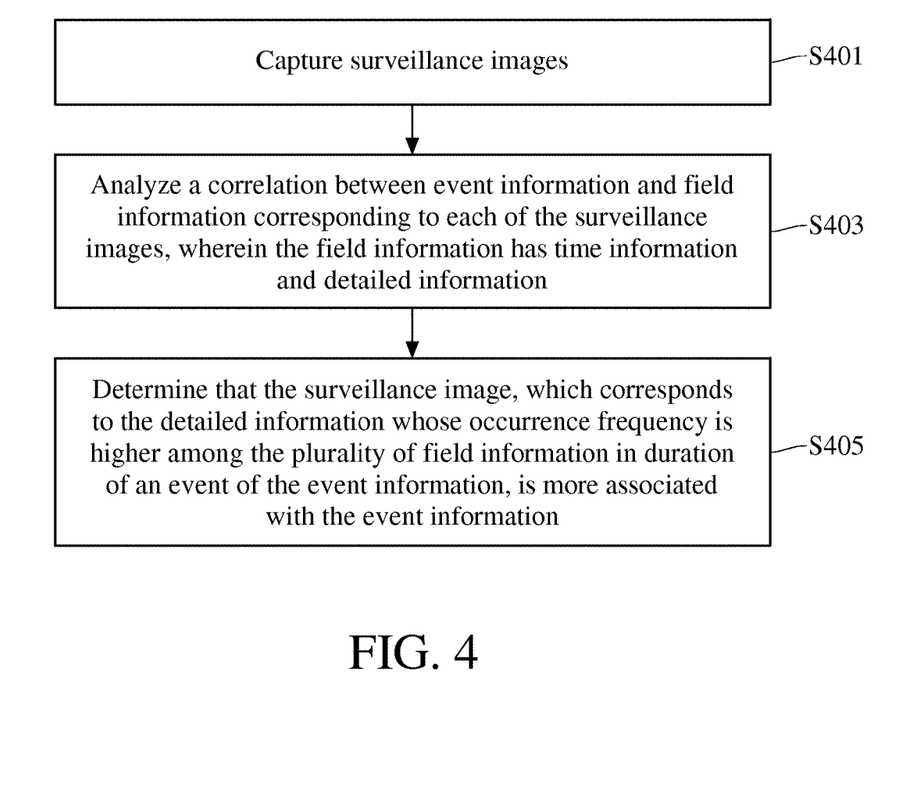
FIG. 4 is a flow chart of a surveillance method in an embodiment.

For the operation of the above surveillance system, the disclosure also provides a surveillance method. Please refer to FIG. 4, which is a flow chart of a surveillance method in an embodiment. The surveillance method includes the following steps. First, capture a plurality of surveillance images (step S401). Then, analyze a correlation between event information and each field information of the surveillance images. Each field information includes time information and detailed information (step S403). Then, determine that the surveillance image, corresponding to the detailed information whose occurrence frequency is higher, is more associated with the event information according to an occurrence frequency of each detailed information in the field information in the duration of the event information (step S405).

Figure 5:
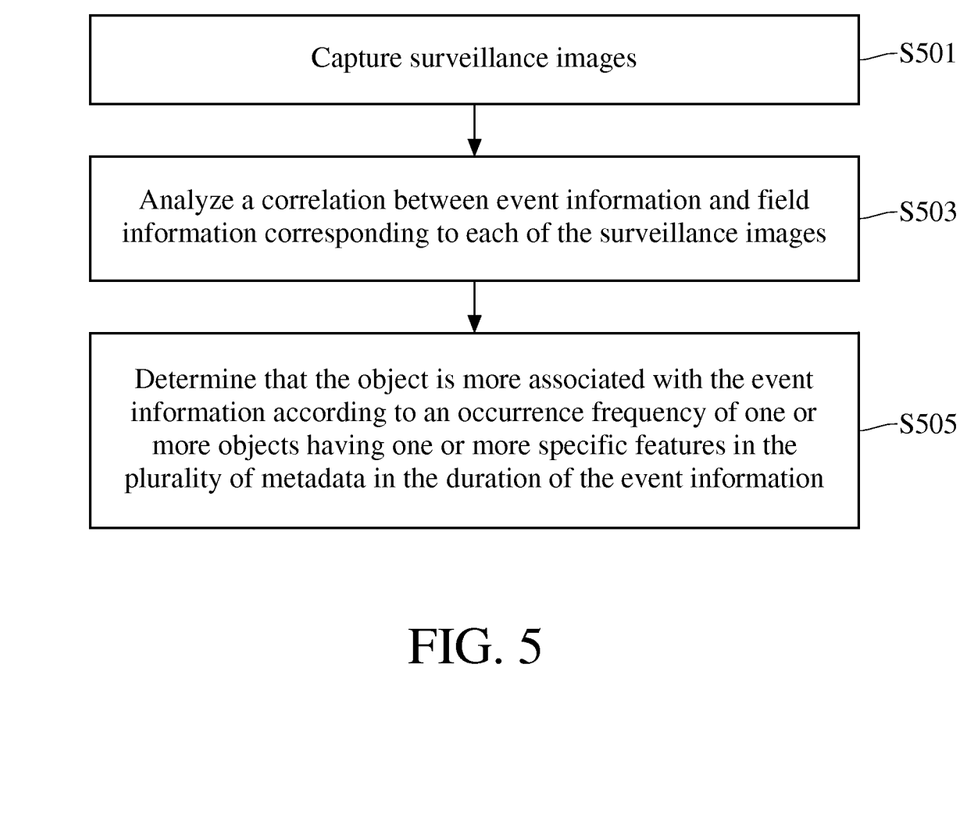
FIG. 5 is a flow chart of a surveillance method in another embodiment.

In an embodiment, the so-called field information herein is the metadata of a respective surveillance image; the time information of the field information corresponds to the time of the surveillance image; and the detailed information of the field information corresponds to at least one object and at least one feature of the object appearing in the surveillance image. Please refer to FIG. 5, which is a flow chart of a surveillance method in another embodiment. This surveillance method includes the following steps. First, capture surveillance images (step S501). Then, analyze the correlation between the event information and the metadata corresponding to each of the surveillance images (step S503). Search for the object, which is more associated with the event information, among the metadata of the surveillance images according to the occurrence frequency of at least one object having at least one feature in the duration of the event information (step S505). The at least one object herein includes at least one of one or more humans and vehicles appearing in the associated surveillance image, and the at least one feature herein includes at least one out of a gender, approximate age, appearance, color, vehicle model and vehicle registration number. In an embodiment, the surveillance method includes the analysis of contents of the surveillance images and the production of respective metadata based on the content of each of the surveillance images.

In another embodiment, the surveillance method further uses an association rule to the association analysis and calculate an correlation coefficient of each of the objects according to the occurrence frequencies of all features of all objects in the duration of the event information; and when the correlation coefficient of one of the objects is greater than a preset threshold, this object having the correlation coefficient greater than the preset threshold will be considered to be more associated with the event information. Moreover, when there are at least two objects whose correlation coefficients are greater than the preset threshold, a correlation list recording the at least two objects will be established according to the magnitudes of the correlation coefficients of the at least two objects.

In an embodiment, the surveillance method produces real-time metadata corresponding to a respective surveillance image and performs the above association analysis to the metadata in real time. For example, surveillance images associated with scenes of exits and entrances of a public place are captured, and the above association analysis is performed in real time to the surveillance images and the event information in order to distinguish any suspicious person. In another embodiment, the surveillance method stores the metadata of each surveillance image to file for reference. For example, metadata is digitally stored in the database; and once an incident happens, the stored metadata will be read in order to perform an association analysis to the read metadata and the event information of the incident. In yet another embodiment, in addition to saving the metadata of each surveillance image, the surveillance method also saves the surveillance images in order to produce new metadata by a different analysis method and then either replace the old metadata by the new metadata or perform cross analysis and comparison of both the new and old metadata. In yet another embodiment of the surveillance method, after partial metadata is produced according to a surveillance image, the partial metadata as well as the surveillance image is stored, and the remaining metadata associated with the surveillance image will be produced afterward.

As described above, the disclosure involves a surveillance system and a surveillance method and employs at least one the image capturing device to capture a respective surveillance image and analyze the correlation between the field information about the surveillance image and certain event information in order to determine one or more surveillance images more associated with the event information. In practice, such field information is metadata corresponding to one respective surveillance image. The disclosure may use an association rule to compare the correlations between multiple metadata and the event information in order to search for at least one object associated with the event information in the surveillance images. In this way, if an incident occurs, users merely input event information about the incident into the surveillance system, a computing apparatus in the surveillance system will automatically analyze and determine an object more associated with the incident, a surveillance image corresponding to the object, and a capturing time of the surveillance image. Accordingly, it may be achieved to avoid spending lots of time and human labor on retrieving and surveying thousands of surveillance image files and enhance the reliability and efficiency of solving a criminal case, whereby the disclosure is full of practicability.

What is claimed is:

1. A surveillance system, comprising:
   at least one image capturing device configured to capture surveillance images; and
   a processor electrically connected to the at least one image capturing device and configured to analyze correlation between event information and field information corresponding to each of the surveillance images, wherein each piece of field information comprises time information and detailed information, and the processor is configured to, according to an occurrence frequency of one piece of the detailed information in the plurality of field information in duration of the event information, determine that the surveillance image, which corresponds to the detailed information whose occurrence frequency is higher, is more associated with the event information.

2. The surveillance system according to claim 1, wherein each piece of the field information is metadata corresponding to one of the surveillance images, and each piece of detailed information comprises information about one or more objects in the surveillance image and information about one or more features of the object; and
   according to an occurrence frequency of one object having a specific feature among the objects in the plurality of metadata in the duration of the event information, the processor is configured to determine that the object having the specific feature is more associated with the event information.

3. The surveillance system according to claim 2, further comprising:
   an image analysis module configured to analyze the surveillance image captured by the image capturing device and generate the metadata according to the analysis.

4. The surveillance system according to claim 2, wherein the object comprises at least one of one or more humans and vehicles shown in the surveillance image, and the feature comprises at least one out of a gender, age, appearance, color, vehicle model and vehicle registration number.

5. The surveillance system according to claim 2, wherein the processor is configured to perform an association analysis according to an association rule, by which the processor calculates a correlation coefficient for the object according to an occurrence frequency of each feature of each object in the duration of the event information; and
   when the correlation coefficient of the object is greater than a preset threshold, the processor determines that the object corresponding to the correlation coefficient is more associated with the event information.

6. The surveillance system according to claim 5, wherein when the processor determines that there are at least two objects whose correlation coefficients are greater than the preset threshold, the processor further establishes a correlation list associated with the at least two objects according to magnitudes of the correlation coefficients of the at least two objects.

7. A surveillance method applied to a surveillance system comprising at least one image capturing device and a processor, and the surveillance method comprising:
   capturing surveillance images;
   analyzing a correlation between event information and field information corresponding to each of the surveillance images, and each piece of field information comprising time information and detailed information; and
   determining that the surveillance image, which corresponds to the detailed information whose occurrence frequency is higher among the plurality of field information in duration of an event of the event information, is more associated with the event information.

8. The surveillance method according to claim 7, wherein each of the plurality of field information is metadata corresponding to one of the surveillance images, and the detailed information comprises information about one or more objects in the surveillance image and information about one or more features of the object; and
   determining that the object, which has a specific feature, is more associated with the event information according to an occurrence frequency of the object having the specific feature in the plurality of metadata in the duration of the event information.

9. The surveillance method according to claim 8, further comprising:
   analyzing the surveillance images to generate the plurality of metadata according to the analysis of the surveillance images.

10. The surveillance method according to claim 8, wherein the objects comprise at least one of one or more humans and vehicles shown in the surveillance image, and the features comprise at least one out of a gender, age, appearance, color, vehicle model and vehicle registration number.

11. The surveillance method according to claim 8, further comprising:
    performing an association analysis according to an association rule to calculate an correlation coefficient of the object according to an occurrence frequency of each feature of the object in the duration of the event information; and
    determining that the object is more associated with the event information when the correlation coefficient of the object is greater than a preset threshold.

12. The surveillance method according to claim 11, further comprising:
    establishing a correlation list related to at least two objects according to magnitudes of the correlation coefficients of the at least two objects when the at least two objects have correlation coefficients greater than the preset threshold.

* * * * *